United States Patent
Lee

(10) Patent No.: US 9,160,475 B2
(45) Date of Patent: Oct. 13, 2015

(54) METHOD OF HANDLING HARQ RESOURCE IN TDD SYSTEM AND RELATED COMMUNICATION DEVICE

(71) Applicant: Industrial Technology Research Institute, Hsinchu (TW)

(72) Inventor: Chien-Min Lee, New Taipei (TW)

(73) Assignee: Industrial Technology Research Institute, Chutung, Hsinchu (TW)

(*) Notice: Subject to any disclaimer, the term of this patent is extended or adjusted under 35 U.S.C. 154(b) by 155 days.

(21) Appl. No.: 13/909,043

(22) Filed: Jun. 3, 2013

(65) Prior Publication Data

US 2013/0329703 A1 Dec. 12, 2013

Related U.S. Application Data

(60) Provisional application No. 61/656,493, filed on Jun. 6, 2012.

(51) Int. Cl.
*H04J 3/16* (2006.01)
*H04L 1/18* (2006.01)

(52) U.S. Cl.
CPC ............ *H04J 3/1694* (2013.01); *H04L 1/1893* (2013.01)

(58) Field of Classification Search
CPC . H04W 72/04; H04W 72/0406; H04J 3/1694; H04L 1/1893; H04L 1/1841
USPC .......................................................... 370/336
See application file for complete search history.

(56) References Cited

U.S. PATENT DOCUMENTS

| | | | |
|---|---|---|---|
| 2011/0013564 A1* | 1/2011 | Zou et al. ...................... 370/328 |
| 2011/0041027 A1* | 2/2011 | Fong et al. .................... 714/749 |
| 2011/0255484 A1 | 10/2011 | Zhang |
| 2012/0120854 A1 | 5/2012 | Zhang |
| 2013/0083753 A1* | 4/2013 | Lee et al. ...................... 370/329 |
| 2014/0133439 A1* | 5/2014 | Yamada et al. ............... 370/329 |
| 2014/0161001 A1* | 6/2014 | Gao et al. ...................... 370/280 |

FOREIGN PATENT DOCUMENTS

| | | |
|---|---|---|
| CN | 101505497 A | 8/2009 |
| TW | 201215027 | 4/2012 |
| WO | 2008024340 A2 | 2/2008 |
| WO | 2011047196 A1 | 4/2011 |

OTHER PUBLICATIONS

Renesas Mobile Europe Ltd., "HARQ Procedure for Full Duplex Mode in CC specific TDD configuration", 3GPP TSG-RAN WG1 Meeting #67, R1-113888, San Francisco, CA, USA, Nov. 14-18, 2011.

* cited by examiner

*Primary Examiner* — Sulaiman Nooristany
(74) *Attorney, Agent, or Firm* — Winston Hsu; Scott Margo

(57) ABSTRACT

A method of determining HARQ resource of a UL subframe comprises determining a first new association set of the UL subframe according to an association set of the UL subframe of a first UL/DL configuration of a legacy communication device; replacing a subset of the first new association set by a subset of an association set of the UL subframe of a second UL/DL configuration of an advanced communication device, when the legacy communication device is not able to perform a reception in at least one subframe corresponding to the subset of the first new association set; configuring a mapping between at least one sequence index of the UL subframe of the first UL/DL configuration and the first new association set according to the first UL/DL configuration; and determining the HARQ resource of the UL subframe according to the mapping and the first new association set.

14 Claims, 10 Drawing Sheets

| UL/DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0: Advanced UE | - | - | 6 | - | 4 | - | - | 6 | - | 4 |
| 2: Legacy UE | - | - | 8, 7, 4, 6 | - | - | - | - | 8, 7, 4, 6 | - | - |
| 0: Advanced UE (New) | - | - | 6, 7 | - | 4 | - | - | 6, 7 | - | - | m=0,1,2,3 → 8,7,4,6
m=0,1 → 6,7 Advanced UE
8,7,4,6

FIG. 9

METHOD OF HANDLING HARQ RESOURCE IN TDD SYSTEM AND RELATED COMMUNICATION DEVICE

CROSS REFERENCE TO RELATED APPLICATIONS

This application claims the benefit of U.S. Provisional Application No. 61/656,493, filed on Jun. 6, 2012 and entitled "Methods for Assigning HARQ resource in TDD system and apparatus using the same", the contents of which are incorporated herein in their entirety.

BACKGROUND OF THE INVENTION

1. Field of the Invention

The present invention relates to a method used in a wireless communication system and related communication device, and more particularly, to a method of handling hybrid automatic repeat request (HARQ) resource in a time-division duplexing (TDD) and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Different from the LTE/LTE-A system with frequency-division duplexing (FDD), directions of subframes of a frequency band in the LTE/LTE-A system with time-division duplexing (TDD) may be different. That is, the subframes in the same frequency band are divided into uplink (UL) subframes, downlink (DL) subframes and special subframes according to the UL/DL configuration specified in the 3GPP standard.

Please refer to FIG. 1 which is a table 10 of the UL/DL configuration with subframes and corresponding directions. In FIG. 1, 7 UL/DL configurations are shown, wherein each of the UL/DL configurations indicates a set of directions for 10 subframes, respectively. In detail, "U" means that the subframe is a UL subframe where UL data is transmitted, and "D" means that the subframe is a DL subframe where DL data is transmitted. "S" means that the subframe is a special subframe where control information and maybe data (according to the special subframe configuration) is transmitted, and the special subframe can also be seen as the DL subframe in the present invention.

Furthermore, a UL/DL configuration of a legacy UE can be changed according to system information (e.g., System Information Block Type 1 (SIB1)) transmitted by an eNB, e.g., from the UL/DL configuration 1 to the UL/DL configuration 3. A minimum periodicity of transmitting the SIB1 is usually large (e.g., 640 ms), and the legacy UE can only change the UL/DL configuration with the periodicity equal or greater than 640 ms. The semi-statics allocation cannot match fast varying traffic characteristics and environments, and there is space for improving system performance. Thus, changing the UL/DL configuration with a lower periodicity (e.g., lower than 640 ms) is considered.

In general, the legacy UE is configured with a UL/DL configuration according to the SIB1, and this UL/DL configuration is also known by an advanced UE which is configured with an additional UL/DL configuration. The additional configuration is a real configuration operated by the eNB, and the eNB provides services (i.e., performs transmissions and/or receptions) to both the legacy UE and the advanced UE according to the additional configuration.

However, when the legacy UE and the advanced UE are configured with difference UL/DL configurations, a collision of HARQ resources may occur if the legacy UE and the advanced UE intend to transmit HARQ feedbacks in a same UL subframe. The collision may occur due to that the legacy UE and the advanced UE transmitting the HARQ feedbacks by using overlapped HARQ resource (e.g., the same HARQ resource) in the UL subframe. In this situation, the network cannot detect the HARQ feedbacks transmitted by the legacy UE and the advanced UE. Communications between the network and the legacy UE and the advanced UE cannot proceed regularly.

Thus, how to solve the collision of the HARQ resources caused due to different UL/DL configurations of the legacy UE and the advanced UE is an important topic to be discussed.

SUMMARY OF THE INVENTION

The present invention therefore provides a method and related communication device for handling HARQ resource in a time-division duplexing (TDD) system to solve the abovementioned problem.

A method of determining hybrid automatic repeat request (HARQ) resource of an uplink (UL) subframe for an advanced communication device comprises determining a first new association set of the UL subframe according to an association set of the UL subframe of a first UL/downlink (DL) configuration of a legacy communication device; replacing a subset of the first new association set by a subset of an association set of the UL subframe of a second UL/DL configuration of the advanced communication device, when the legacy communication device is not able to perform a reception in at least one subframe corresponding to the subset of the first new association set; configuring a mapping between at least one sequence index of the UL subframe of the first UL/DL configuration and the first new association set according to the first UL/DL configuration; and determining the HARQ resource of the UL subframe according to the mapping and the first new association set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 5-10 are schematic diagrams of association sets of the advanced UE and the legacy UE with different UL/DL configurations according to an example of the present invention.

DETAILED DESCRIPTION

Figure 1:
FIG. 1 is a table 10 of the UL/DL configuration with subframes and corresponding directions.
Figure 2:
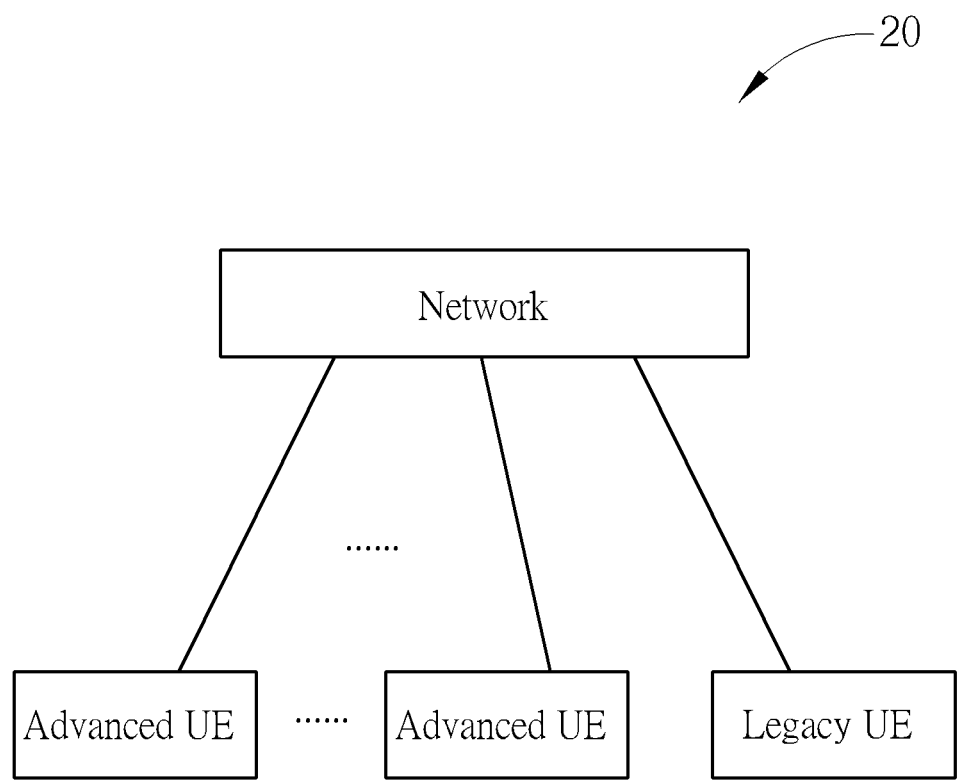
FIG. 2 is a schematic diagram of a wireless communication system according to an example of the present invention.

Please refer to FIG. 2, which is a schematic diagram of a wireless communication system 20 according to an example of the present invention. The wireless communication system 20 is briefly composed of a network, advanced user equipments (UEs) and a legacy UE. The wireless communication system 20 supports a time-division duplexing (TDD) mode. That is, the network and the UEs can communicate with each other by using uplink (UL) subframes and downlink (DL) subframes according to one or more UL/DL configurations. A minimum periodicity for changing an UL/DL configuration of the advanced UE is smaller than a minimum periodicity for changing a UL/DL configuration of the legacy UE. That is, the advanced UE can change its UL/DL configuration fast according to fast varying traffic characteristics and environments. Besides, the advanced UE know the UL/DL configuration of the legacy UE, e.g., according to System Information Block Type 1 (SIB1) transmitted by the network. For example, the advanced UE may refer to a communication device supporting the 3rd Generation Partnership Project (3GPP) Rel-11 standard or later versions. However, this is not a restriction, and the legacy UE may also have functions similar to those supported by the advanced UE via an update, and is not limited herein. In another example, the advanced UE may refer to a communication device support an enhanced interference mitigation and traffic adaption (EIMTA) function. In this situation, the legacy may refer to a communication device which does not enable (e.g., support) the EIMTA function.

In FIG. 2, the network and the UEs are simply utilized for illustrating the structure of the wireless communication system 20. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a UE (advanced UE or legacy UE), the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network. A UE can be a mobile phone, a laptop, a tablet computer, an electronic book or a portable computer system but is not limited. Besides, the network and the UE can be seen as a transmitter or a receiver according to direction, e.g., for an UL, the UE is the transmitter and the network is the receiver, and for a DL, the network is the transmitter and the UE is the receiver. More specifically, for the network, the direction of the transmission is DL, and the direction of the reception is UL. For the UE, the direction of the transmission is UL, and the direction of the reception is DL.

Figure 3:
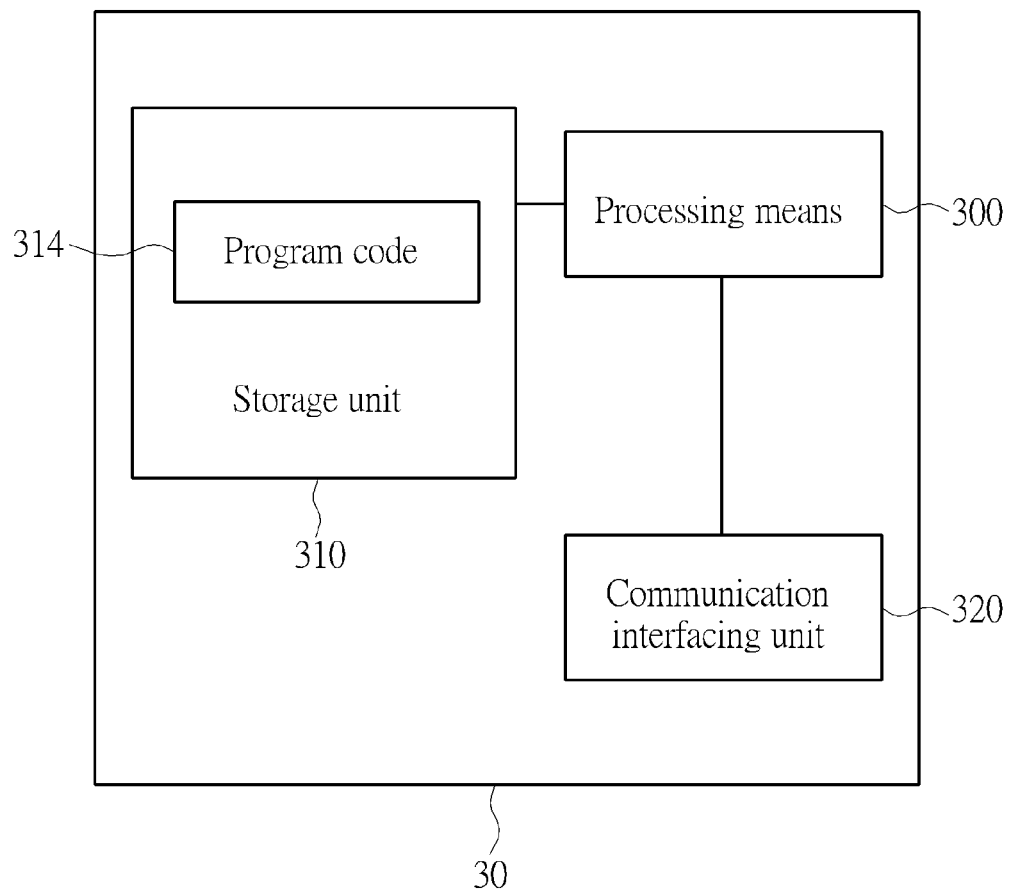
FIG. 3 is a schematic diagram of a communication device according to an example of the present invention.

Please refer to FIG. 3, which is a schematic diagram of a communication device 30 according to an example of the present invention. The communication device 30 can be an advanced UE, the legacy UE or the network shown in FIG. 2, but is not limited herein. The communication device 30 may include a processing means 300 such as a microprocessor or Application Specific Integrated Circuit (ASIC), a storage unit 310 and a communication interfacing unit 320. The storage unit 310 may be any data storage device that can store a program code 314, accessed and executed by the processing means 300. Examples of the storage unit 310 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 320 is preferably a transceiver and is used to transmit and receive signals (e.g., messages or packets) according to processing results of the processing means 300.

Figure 4:
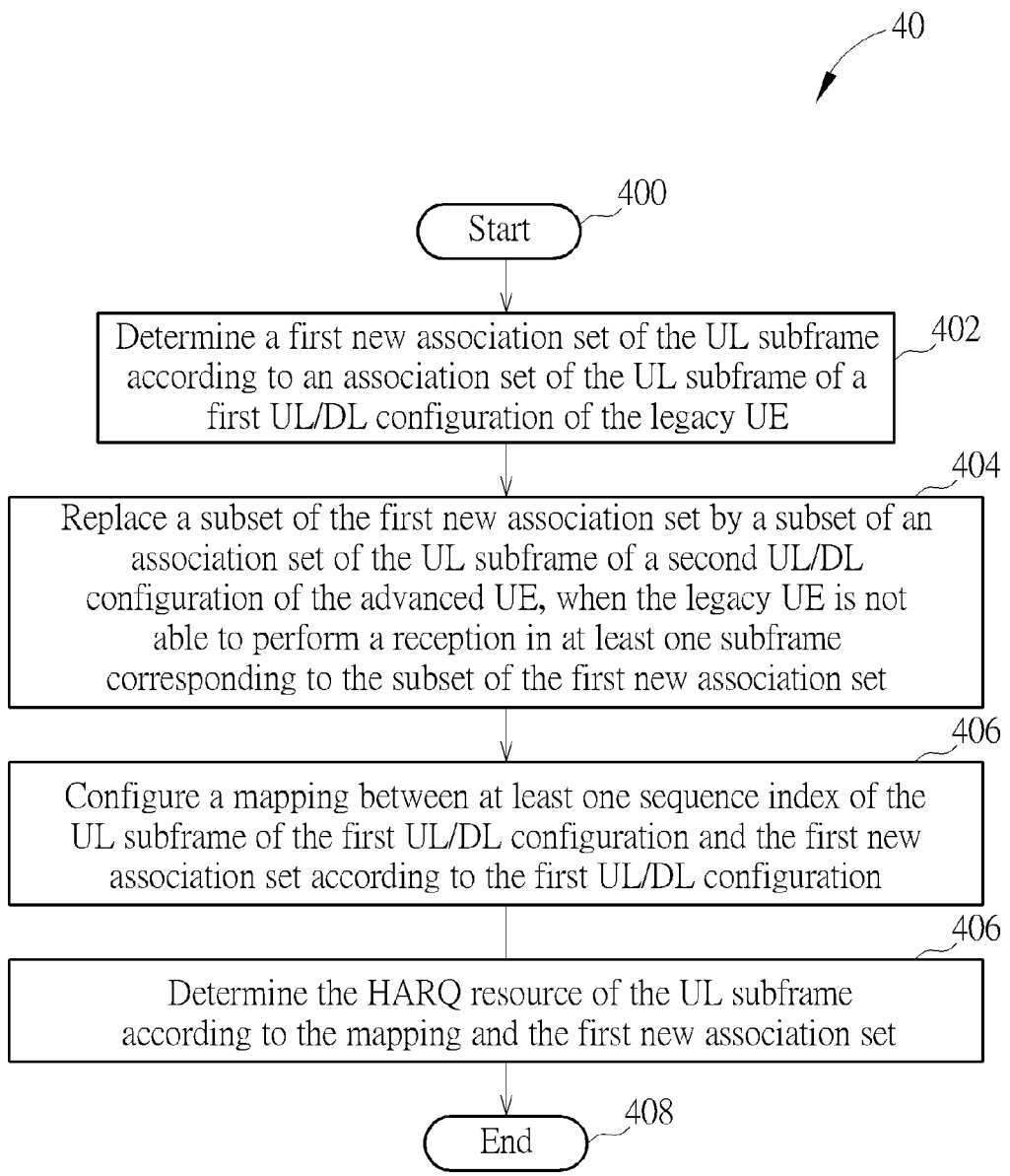
FIG. 4 is a flowchart of a process according to an example of the present invention.

Please refer to FIG. 4, which is a flowchart of a process 40 according to an example of the present invention. The process 40 is utilized in the advanced UE shown in FIG. 2, for determining hybrid automatic repeat request (HARQ) resource of a UL subframe. The process 40 may be compiled into the program code 314 and includes the following steps:

Step 400: Start.

Step 402: Determine a first new association set of the UL subframe according to an association set of the UL subframe of a first UL/DL configuration of the legacy UE.

Step 404: Replace a subset of the first new association set by a subset of an association set of the UL subframe of a second UL/DL configuration of the advanced UE, when the legacy UE is not able to perform a reception in at least one subframe corresponding to the subset of the first new association set.

Step 406: Configure a mapping between at least one sequence index of the UL subframe of the first UL/DL configuration and the first new association set according to the first UL/DL configuration.

Step 408: Determine the HARQ resource of the UL subframe according to the mapping and the first new association set.

Step 410: End.

According to the process 40, the advanced UE first determines a first new association set of the UL subframe according to an association set of the UL subframe of a first UL/DL configuration of the legacy UE. Then, the advanced UE replaces a subset of the first new association set by a subset of an association set of the UL subframe of a second UL/DL configuration of the advanced UE, when the legacy UE is not able to perform a reception in at least one subframe corresponding to the subset of the first new association set. Then, the advanced UE configures (e.g., establishes) a mapping between at least one sequence index of the UL subframe of the first UL/DL configuration and the first new association set according to the first UL/DL configuration (i.e., the mapping of the UL subframe of the first UL/DL configuration), and determines the HARQ resource of the UL subframe according to the mapping and the first new association set. In other words, the advanced UE determines the HARQ resource for transmitting HARQ feedbacks according to the UL/DL configuration of the legacy UE and properties (e.g., directions) of subframes to be acknowledged. Note that the subset may be the entire set. For example, the entire first new association set is replaced. In another example, the subset of the first new association set may be replaced by the entire association set of the UL subframe of the second UL/DL configuration. Thus, the collision of the HARQ resources can be solved, while the operation of the legacy UE is not affected. As a result, communications between the network and the legacy UE and the advanced UE can proceed regularly.

Figure 5:
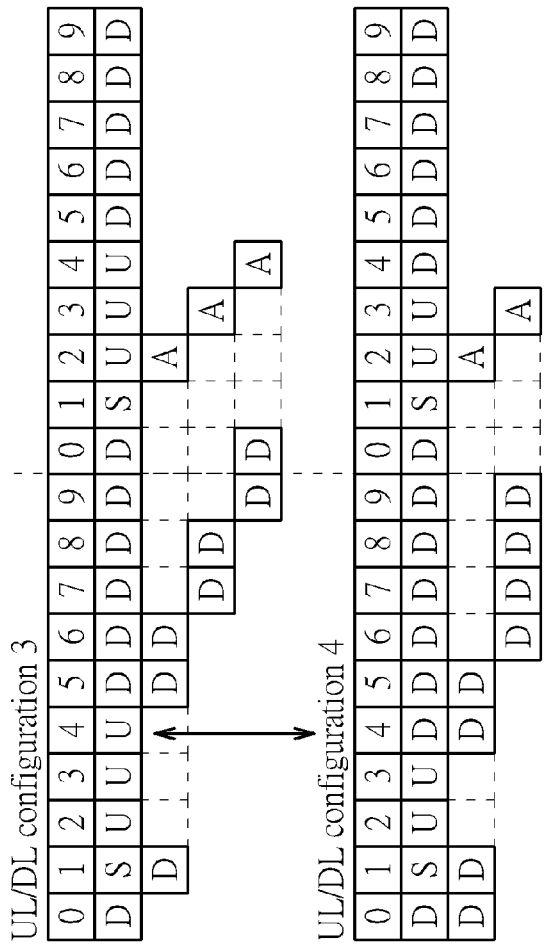

Please note that, realization of the process 40 is not limited. Please refer to FIG. 5, which is a schematic diagram of association sets of the advanced UE and the legacy UE with different UL/DL configurations according to an example of the present invention, wherein subframe allocations corresponding to the UL/DL configurations are shown in the upper half of FIG. 5. In detail, the advanced UE and the legacy UE are configured with the UL/DL configurations 3 and 4, respectively, wherein the UL/DL configuration of the legacy UE may be a SIB1 configuration. Association sets for various UL subframes and UL/DL configurations are shown in FIG. 5. For example, the association set of the subframe 2 which includes the association set indices 7, 6 and 11 will be used for determining HARQ resource according to the prior art, when the advanced UE intends to transmit a HARQ feedback in the subframe 2. In addition, the HARQ feedback corresponds to DL receptions in DL subframes corresponding to the association set indices 7, 6 and 11, wherein the DL subframes are the subframes 5, 6 and 1 of a previous frame in the present example. The sequence indices m mapping to the association set indices are shown on the top of the association set. For example, the association set indices 7, 6 and 11 of the subframe 2 of the UL/DL configuration 2 are mapped by the sequence indices 0, 1 and 2, respectively.

According to the process 40 and the above description, the advanced UE can determine the first new association set as the association set of the legacy UE, replace the subset of the first new association set by the subset of the association set of the UL subframe of the UL/DL configuration 3 when the legacy UE is not able to perform the reception in the at least one subframe corresponding to the subset of the first new association set, and configure the mapping between the sequence indices and the first new association set as the mapping used by the legacy UE. Preferably, each association set index of the subset of the UL subframe of the UL/DL configuration 3 and each association set index of the rest of the first new association set (i.e., association set index not being replaced) are different. That is, when the subframe 2 is considered, the advanced UE first determines the first new association set as (12, 8, 7, 11). Then, the advanced UE replaces the association set index 8 by the association set index 6, since the association set index 8 corresponds to the subframe 4 in the previous frame and the subframe 4 is actually a UL subframe. More specifically, the subframe 4 is a DL subframe determined according to the UL/DL configuration 4 operated by the legacy UE, and is the UL subframe determined according to the UL/DL configuration 3 which is the real configuration operated by the network and the advanced UE. The association set indices 7, 6 and 11 are now mapped by the sequence indices 2, 1 and 3, respectively, according to the process 40. Then, the association set indices 6, 7 and 11 with the sequence indices 1, 2 and 3 are used for determining the HARQ resource according to the process 40, when the advanced UE intends to transmit the HARQ feedback in the subframe 2. In addition, the determination of the HARQ resource in the subframe 2 is illustrated in the present example, those skilled in the art can readily determine the HARQ resource in other subframes according to the above description. Note that an interleaving for the first new association set (12, 6, 7, 11) is performed according to the UL/DL configuration 4. That is, the rule for performing the interleaving used by the legacy UE is kept the same, e.g., the number of the sequence indices M which is the size of the first new association set is 4, such that the legacy UE can transmit the HARQ feedback regularly. Thus, the collision of the HARQ resources can be solved, while the operation of the legacy UE is not affected. As a result, communications between the network and the legacy UE and the advanced UE can proceed regularly.

Figure 6:
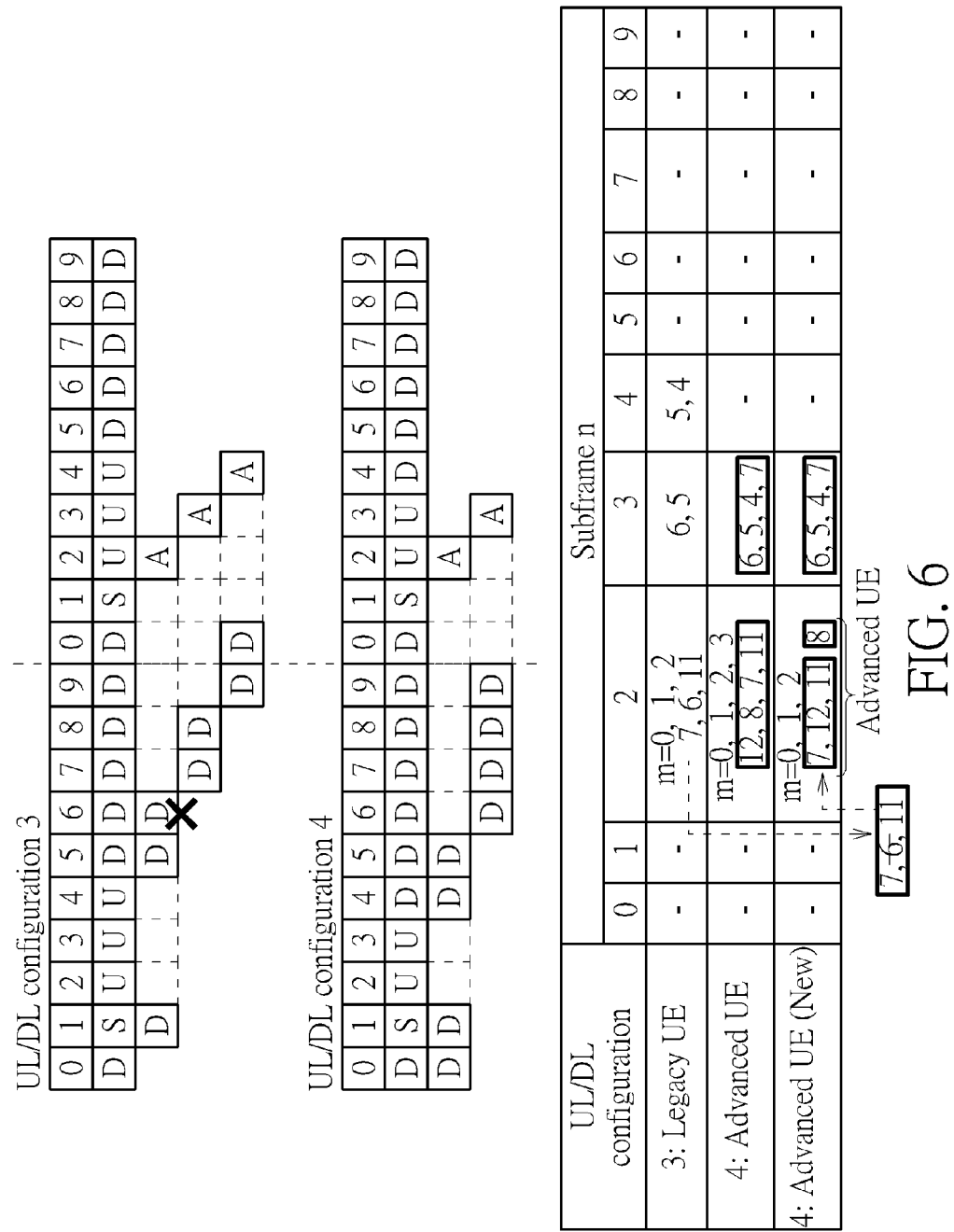

Please refer to FIG. 6, which is a schematic diagram of association sets of the advanced UE and the legacy UE with different UL/DL configurations according to an example of the present invention, wherein subframe allocations corresponding to the UL/DL configurations are shown in the upper half of FIG. 6. In detail, the advanced UE and the legacy UE are configured with the UL/DL configurations 4 and 3, respectively, wherein the UL/DL configuration of the legacy UE may be a SIB1 configuration. Association sets for various UL subframes and UL/DL configurations are shown in FIG. 6. For example, the association set of the subframe 2 which includes the association set indices 12, 8, 7 and 11 will be used for determining HARQ resource according to the prior art, when the advanced UE intends to transmit a HARQ feedback in the subframe 2. In addition, the HARQ feedback corresponds to DL receptions in DL subframes corresponding to the association set indices 12, 8, 7 and 11, wherein the DL subframes are the subframes 0, 4, 5 and 1 of a previous frame in the present example. The sequence indices m mapping to the association set indices are shown on the top of the association set. For example, the association set indices 12, 8, 7 and 11 of the subframe 2 of the UL/DL configuration 4 are mapped by the sequence indices 0, 1, 2 and 3, respectively.

According to the process 40 and the above description, the advanced UE determines the first new association set as the association set of the legacy UE, replaces the subset of the first new association set by the subset of the association set of the UL subframe of the UL/DL configuration 4 when the legacy UE is not able to perform the reception in the at least one subframe corresponding to the subset of the first new association set, determines a second new association set of the UL subframe of the UL/DL configuration 4, and configures the mapping between the sequence indices and the first new association set as the mapping used by the legacy UE. Preferably, each association set index of the subset of the UL subframe of the UL/DL configuration 4 and each association set index of the rest of the first new association set (i.e., association set index not being replaced) are different. That is, when the subframe 2 is considered, the advanced UE first determines the first new association set as (7, 6, 11). Then, the advanced UE replaces the association set index 6 by the association set index 12, since the association set index 6 corresponds to the subframe 6 in the previous frame and the subframe 6 is not available for the legacy UE. For example, the network does not schedule the subframe 6 to the legacy UE for performing the reception, and the advanced UE may be notified by the network such scheduling decision. Then, the advanced UE determines the second new association set as "8" according to the UL/DL configuration 4.

Figure 7:
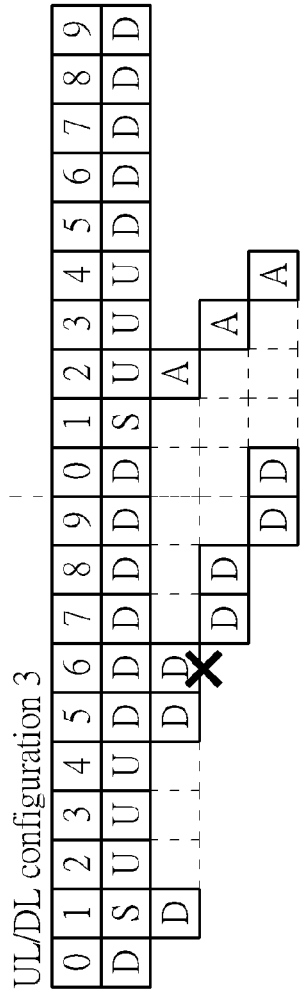
Figure 7:
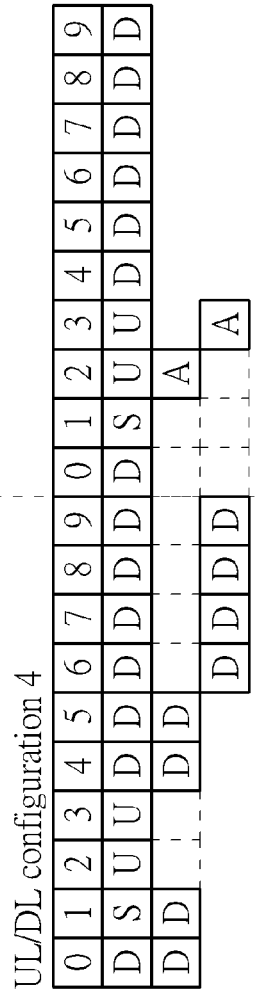

As can be seen, the second new association set does not overlap with the first new association set. In addition, the second new association set does not overlap with the subset of the UL subframe of the UL/DL configuration 4 (i.e., "12"), as shown in FIG. 7. The association set indices 7, 12 and 11 are now mapped by the sequence indices 0, 1 and 2, respectively, according to the process 40. Preferably, a resource region (e.g., physical UL control channel (PUCCH) resource region) corresponding to the first new association set does not overlap with a resource region corresponding to the second new association set. Then, the association set indices 7, 12 and 11 in the first new association set with the sequence indices 0, 1 and 2 and the second new association set with corresponding sequence index are used for determining the HARQ resource according to the process 40, when the advanced UE intends to transmit the HARQ feedback in the subframe 2. Accordingly, the HARQ resource in the resource region corresponding to the first new association set do not overlap with the HARQ resource in the resource region corresponding to the second new association set. Note that a sequence index for the association set index 8 in the second new association set can be specified according to system requirements and design considerations, and is not limited herein. In addition, the determination of the HARQ resource in the subframe 2 is illustrated in the present example, those skilled in the art can readily determine the HARQ resource in other subframes according to the above description. Note that an interleaving for the first subset of the association set (7, 12, 11) is performed according to the UL/DL configuration 3. That is, the rule for performing the interleaving used by the legacy UE is kept the same, e.g., the number of the sequence indices M is 3, such that the legacy UE can transmit the HARQ feedback regularly. Thus, the collision of the HARQ resources can be solved, while the operation of the legacy UE is not affected. As a result, communications between the network and the legacy UE and the advanced UE can proceed regularly.

Please refer to FIG. 7, which is a schematic diagram of association sets of the advanced UE and the legacy UE with different UL/DL configurations according to an example of the present invention, wherein subframe allocations corresponding to the UL/DL configurations are shown in the upper half of FIG. 7. In detail, the advanced UE and the legacy UE are configured with the UL/DL configurations 4 and 3, respectively, wherein the UL/DL configuration of the legacy UE may be a SIB1 configuration. Association sets for various UL subframes and UL/DL configurations are shown in FIG. 7. Detailed description of the association sets can be referred to the previous description, and is not narrated herein.

According to the process 40 and the above description, the advanced UE determines the first new association set as the association set of the legacy UE, replaces the subset of the first new association set by the subset of the association set of the UL subframe of the UL/DL configuration 4 when the legacy UE is not able to perform the reception in the at least one subframe corresponding to the subset of the first new association set, determines a second new association set of the UL subframe of the UL/DL configuration 4, and configures the mapping between the sequence indices and the first new association set as the mapping used by the legacy UE. Preferably, each association set index of the subset of the UL subframe of the UL/DL configuration 4 and each association set index of the rest of the first new association set (i.e., association set index not being replaced) are different. That is, when the subframe 2 is considered, the advanced UE first determines the first new association set as (7, 6, 11). Then, the advanced UE replaces the association set index 6 by the association set index 12, since the association set index 6 corresponds to the subframe 6 in the previous frame and the subframe 6 is not available for the legacy UE. For example, the network does not schedule the subframe 6 to the legacy UE for performing the reception, and the advanced UE may be notified by the network such scheduling decision. Then, the advanced UE determines the second new association set as (8, 7, 11) according to the UL/DL configuration 4.

As can be seen, the second new association set overlaps with the first new association set. In addition, the second new association set does not overlap with the subset of the UL subframe of the UL/DL configuration 4 (i.e., "12"), as shown in FIG. 7. The association set indices 7, 12 and 11 are now mapped by the sequence indices 0, 1 and 2, respectively, according to the process 40. Preferably, a resource region (e.g., PUCCH resource region) corresponding to the first new association set does not overlap with a resource region corresponding to the second new association set. Then, the association set index 12 in the first new association set with the sequence index 1 and the second new association set with corresponding sequence indices are used for determining the HARQ resource according to the process 40, when the advanced UE intends to transmit the HARQ feedback in the subframe 2. Accordingly, the HARQ resource in the resource region corresponding to the first new association set do not overlap with the HARQ resource in the resource region corresponding to the second new association set. Note that the sequence indices for the association set indices 8, 7 and 11 in the second new association set can be specified according to system requirements and design considerations, and is not limited herein. In addition, the determination of the HARQ resource in the subframe 2 is illustrated in the present example, those skilled in the art can readily determine the HARQ resource in other subframes according to the above description. Note that an interleaving for the first subset of the association set (7, 12, 11) is performed according to the UL/DL configuration 3. That is, the rule for performing the interleaving used by the legacy UE is kept the same, e.g., the number of the sequence indices M is 3, such that the legacy UE can transmit the HARQ feedback regularly. Thus, the collision of the HARQ resources can be solved, while the operation of the legacy UE is not affected. As a result, communications between the network and the legacy UE and the advanced UE can proceed regularly.

Figure 8:
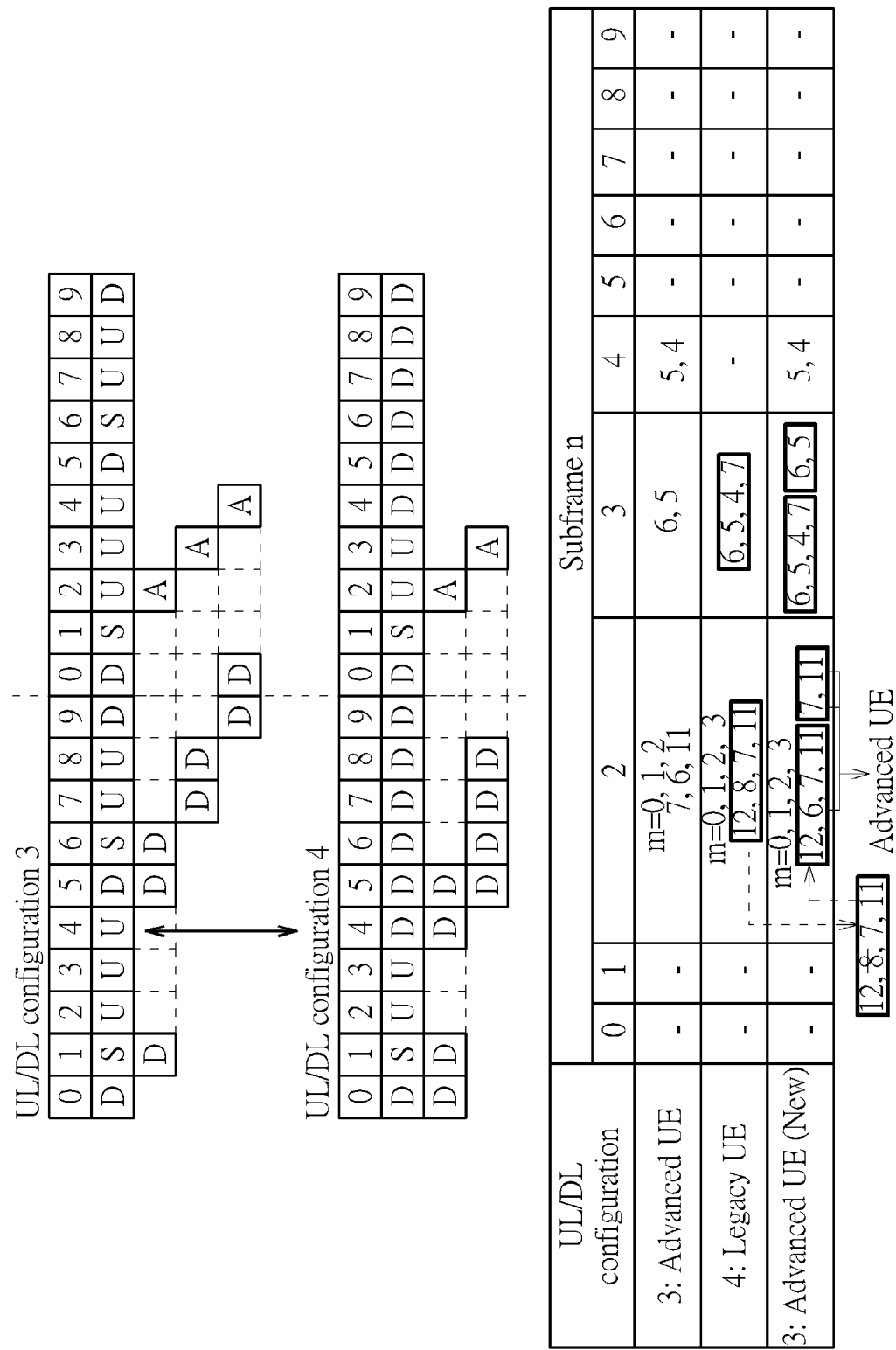

Please refer to FIG. 8, which is a schematic diagram of association sets of the advanced UE and the legacy UE with different UL/DL configurations according to an example of the present invention, wherein subframe allocations corresponding to the UL/DL configurations are shown in the upper half of FIG. 8. In detail, the advanced UE and the legacy UE are configured with the UL/DL configurations 3 and 4, respectively, wherein the UL/DL configuration of the legacy UE may be a SIB1 configuration. Association sets for various UL subframes and UL/DL configurations are shown in FIG. 8. For example, the association set of the subframe 2 which includes the association set indices 7, 6 and 11 will be used for determining HARQ resource according to the prior art, when the advanced UE intends to transmit a HARQ feedback in the subframe 2. In addition, the HARQ feedback corresponds to DL receptions in DL subframes corresponding to the association set indices 7, 6 and 11, wherein the DL subframes are the subframes 5, 6 and 1 of a previous frame in the present example. The sequence indices m mapping to the association set indices are shown on the top of the association set. For example, the association set indices 7, 6 and 11 of the subframe 2 of the UL/DL configuration 3 are mapped by the sequence indices 0, 1 and 2, respectively.

According to the process 40 and the above description, the advanced UE determines the first new association set as the association set of the legacy UE, replaces the subset of the first new association set by the subset of the association set of the UL subframe of the UL/DL configuration 4 when the legacy UE is not able to perform the reception in the at least one subframe corresponding to the subset of the first new association set, determines a second new association set of the UL subframe of the UL/DL configuration 4, and configures the mapping between the sequence indices and the first new association set as the mapping used by the legacy UE. Preferably, each association set index of the subset of the UL subframe of the UL/DL configuration 3 and each association set index of the rest of the first new association set (i.e., association set index not being replaced) are different. That is, when the subframe 2 is considered, the advanced UE first determines the first new association set as (12, 8, 7, 11). Then, the advanced UE replaces the association set index 8 by the association set index 6, since the association set index 8 corresponds to the subframe 4 in the previous frame and the subframe 4 is actually a UL subframe. More specifically, the subframe 4 is a DL subframe determined according to the UL/DL configuration 4 operated by the legacy UE, and is the UL subframe determined according to the UL/DL configuration 3 which is the real configuration operated by the network and the advanced UE. Then, the advanced UE determines the second new association set as (7, 11) according to the UL/DL configuration 3.

As can be seen, the second new association set overlaps with the first new association set. In addition, the second new association set does not overlap with the subset of the UL subframe of the UL/DL configuration 3 (i.e., "6"), as shown in FIG. 8. The association set indices 12, 6, 7 and 11 are now mapped by the sequence indices 0, 1, 2 and 3, respectively, according to the process 40. Preferably, a resource region (e.g., PUCCH resource region) corresponding to the first new association set does not overlap with a resource region corresponding to the second new association set. Then, the association set index 6 in the first subset of the association set with the sequence index 1 and the second subset of the association set with corresponding sequence indices are used for determining the HARQ resource according to the process 40, when the advanced UE intends to transmit the HARQ feedback in the subframe 2. Accordingly, the HARQ resource in the resource region corresponding to the first new association set do not overlap with the HARQ resource in the resource region corresponding to the second new association set. Note that sequence indices for the association set indices 7 and 11 in the second new association set can be specified according to system requirements and design considerations, and is not limited herein. In addition, the determination of the HARQ resource in the subframe 2 is illustrated in the present example, those skilled in the art can readily determine the HARQ resource in other subframes according to the above description. Note that an interleaving for the first subset of the association set (12, 6, 7, 11) is performed according to the UL/DL configuration 4. That is, the rule for performing the interleaving used by the legacy UE is kept the same, e.g., the number of the sequence indices M is 4, such that the legacy UE can transmit the HARQ feedback regularly. Thus, the collision of the HARQ resources can be solved, while the operation of the legacy UE is not affected. As a result, communications between the network and the legacy UE and the advanced UE can proceed regularly.

Please refer to FIG. 9, which is a schematic diagram of association sets of the advanced UE and the legacy UE with different UL/DL configurations according to an example of the present invention. In detail, the advanced UE and the legacy UE are configured with the UL/DL configurations 0 and 2, respectively, wherein the UL/DL configuration of the legacy UE may be a SIB1 configuration. Association sets for various UL subframes and UL/DL configurations are shown in FIG. 9. Detailed description of the association sets can be referred to the previous description, and is not narrated herein. Note that the legacy UE is restricted to perform receptions in the subframes 0 and 5 of the frames. For example, the network only schedules the legacy UE to perform the receptions in the subframes 0 and 5 of the frames, and the advanced UE may be notified by the network such scheduling decision.

According to the process 40 and the above description, the advanced UE determines the first new association set as the association set of the legacy UE, replaces the subset of the first new association set by the subset of the association set of the UL subframe of the UL/DL configuration 0 when the legacy UE is not able to perform the reception in the at least one subframe corresponding to the subset of the first new association set, and configures the mapping between the sequence indices and the first new association set as the mapping used by the legacy UE. Preferably, each association set index of the subset of the UL subframe of the UL/DL configuration 0 and each association set index of the rest of the first new association set (i.e., association set index not being replaced) are different. That is, when the subframe 2 is considered, the advanced UE first determines the first new association set as (8, 7, 4, 6). Then, the advanced UE replaces the association set indices 8, 4 and 6 by the association set index 6, since the association set indices 8, 4 and 6 correspond to the subframes 4, 8 and 6 where no reception is performed. The association set indices of the first new association set which are 6 and 7 are mapped by the sequence indices 0 and 1, respectively, according to the process 40. Then, the association set index 6 in the first new association set with the sequence index 0 is used for determining the HARQ resource according to the process 40, when the advanced UE intends to transmit the HARQ feedback in the subframe 2. In addition, the determination of the HARQ resource in the subframe 2 is illustrated in the present example, those skilled in the art can readily determine the HARQ resource in other subframes according to the above description. Note that an interleaving for the first new association set (6, 7) is performed according to the UL/DL configuration 2. That is, the rule for performing the interleaving used by the legacy UE is kept the same, e.g., the number of the sequence indices M which is the size of the first new association set is 4, such that the legacy UE can transmit the HARQ feedback regularly. Thus, the collision of the HARQ resources can be solved, while the operation of the legacy UE is not affected. As a result, communications between the network and the legacy UE and the advanced UE can proceed regularly.

Figure 10:
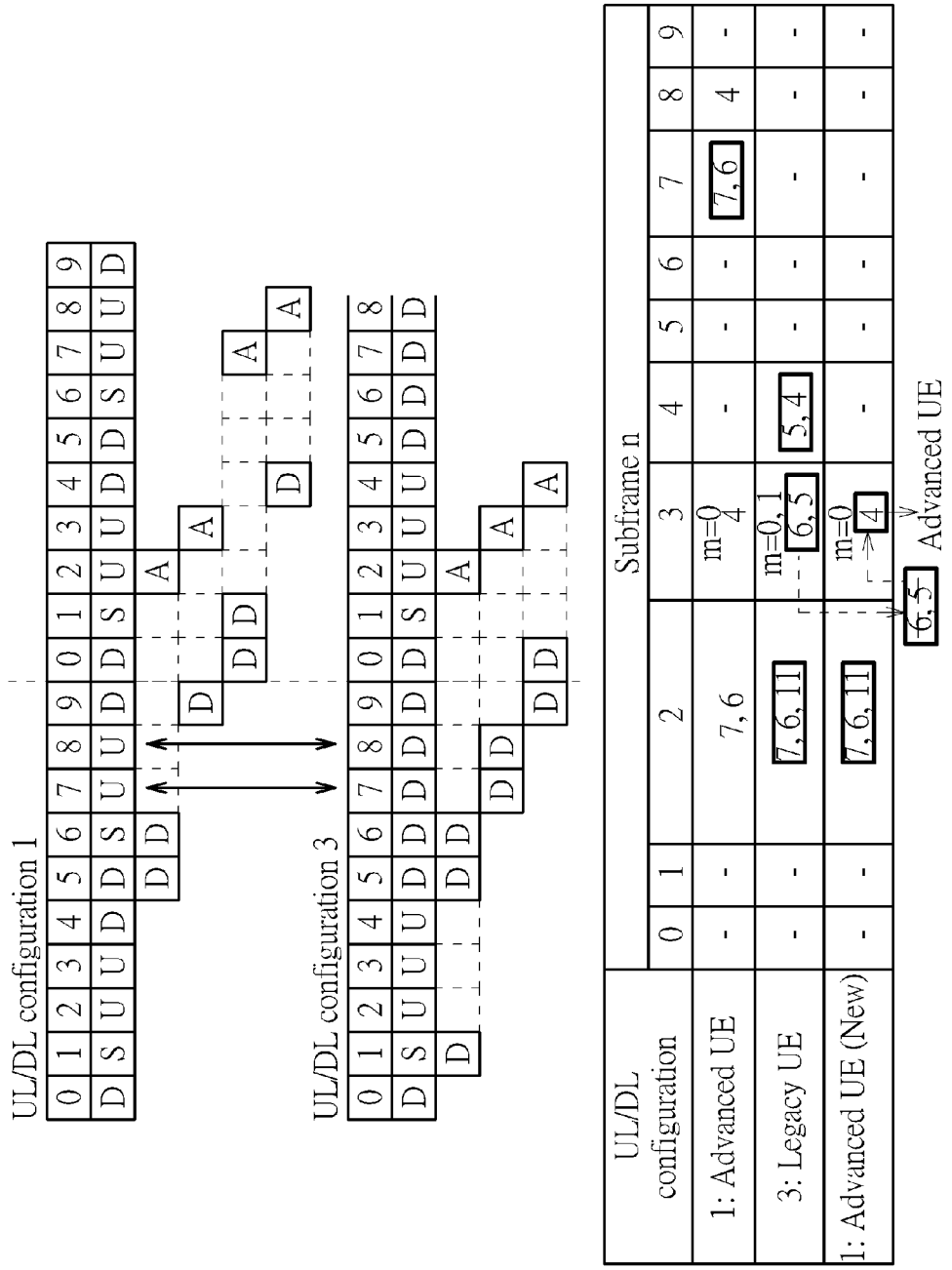

Please refer to FIG. 10, which is a schematic diagram of association sets of the advanced UE and the legacy UE with different UL/DL configurations according to an example of the present invention, wherein subframe allocations corresponding to the UL/DL configurations are shown in the upper half of FIG. 10. In detail, the advanced UE and the legacy UE are configured with the UL/DL configurations 1 and 3, respectively, wherein the UL/DL configuration of the legacy UE may be a SIB1 configuration. Association sets for various UL subframes and UL/DL configurations are shown in FIG.

10. For example, the association set of the subframe 3 which includes the association set index 4 will be used for determining HARQ resource according to the prior art, when the advanced UE intends to transmit a HARQ feedback in the subframe 3. Note that the HARQ feedback corresponds to a DL reception in a DL subframe corresponding to the association set index 4, wherein the DL subframe is the subframe 9 of a previous frame in the present example. The sequence indices m mapping to the association set indices are shown on the top of the association set. For example, the association set index 4 of the subframe 3 of the UL/DL configuration 1 is mapped by the sequence index 0.

According to the process 40 and the above description, the advanced UE can determine the first new association set as the association set of the legacy UE, replace the subset of the first new association set by the subset of the association set of the UL subframe of the UL/DL configuration 1, when the legacy UE is not able to perform the reception in the at least one subframe corresponding to the subset of the first new association set, and configure the mapping between the sequence indices and the first new association set as the mapping used by the legacy UE. Preferably, each association set index of the subset of the UL subframe of the UL/DL configuration 1 and each association set index of the rest of the first new association set (i.e., association set index not being replaced) are different. That is, when the subframe 3 is considered, the advanced UE first determines the first new association set as (6, 5). Then, the advanced UE replaces the association set indices 6 and 5 by the association set index 4, since the association set indices 6 and 5 correspond to the subframes 7 and 8 in the previous frame and the subframes 7 and 8 are actually UL subframes. More specifically, the subframes 7 and 8 are DL subframes determined according to the UL/DL configuration 3 operated by the legacy UE, and are the UL subframes determined according to the UL/DL configuration 1 which is the real configuration operated by the network and the advanced UE. Then, the association set index 4 with a sequence index (e.g., 0) is used for determining the HARQ resource according to the process 40, when the advanced UE intends to transmit the HARQ feedback in the subframe 3. Note that the advanced UE can actually stop configuring the mapping and determine the HARQ resource according to the first new association set without using the mapping, when the advanced UE replaces the first new association set completely by the subset of the association set of the UL subframe of the second UL/DL configuration which is true in the present example. The reason is that the advanced UE does not need to take the operation of the legacy UE into consideration, when the association indices which may be used by the legacy UE are completely replaced. In addition, the determination of the HARQ resource in the subframe 3 is illustrated in the present example, those skilled in the art can readily determine the HARQ resource in other subframes according to the above description. Thus, the collision of the HARQ resources can be solved, while the operation of the legacy UE is not affected. As a result, communications between the network and the legacy UE and the advanced UE can proceed regularly.

The process 40 and the above description can be applied to the case of carrier aggregation (CA), when 2 UL/DL configurations which correspond to 2 component carriers configured to the advanced UE, respectively, are considered. In detail, the first UL/DL configuration may correspond to a primary cell (e.g., primary component carrier), and the second UL/DL configuration may correspond to a secondary cell (e.g., secondary component carrier). Similar to the operation of the legacy UE, the operation related to the primary cell should not be affected, since most control information is transmitted via the primary cell. Thus, the process 40 and the above description can be readily applied (i.e., extended) to the case of the CA, after replacing the legacy UE by the primary cell (i.e., the first UL/DL configuration of the primary cell) and replacing the advanced UE by the secondary cell (i.e., the second UL/DL configuration of the secondary cell) in the abovementioned description and examples.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 30.

To sum up, the present invention provides a method for handling HARQ Resource in the TDD mode. Since the collision of the HARQ resources occurred due to different UL/DL configurations of the advanced UE and the legacy UE is solved, while the operation of the legacy UE is not affected. As a result, communications between the network and the legacy UE and the advanced UE can proceed regularly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of determining hybrid automatic repeat request (HARQ) resource of an uplink (UL) subframe for an advanced communication device, the method comprising:
    determining a first new association set of the UL subframe according to an association set of the UL subframe of a first UL/downlink (DL) configuration of a legacy communication device;
    replacing a subset of the first new association set by a subset of an association set of the UL subframe of a second UL/DL configuration of the advanced communication device, when the legacy communication device is not able to perform a reception in at least one subframe corresponding to the subset of the first new association set;
    configuring a mapping between at least one sequence index of the UL subframe of the first UL/DL configuration and the first new association set according to the first UL/DL configuration; and
    determining the HARQ resource of the UL subframe according to the mapping and the first new association set;
    wherein the first UL/DL configuration is a System Information Block Type 1 (SIB 1) configuration.

2. The method of claim 1, wherein the legacy communication device is not able to perform the reception in the at least one subframe, if the at least one subframe is at least one DL subframe according to the first UL/DL configuration and is at least one UL subframe according to the second UL/DL configuration.

3. The method of claim 1, wherein the legacy communication device is not able to perform the reception in the at least one subframe, if a network notifies the advanced communication device that the network does not schedule the at least one subframe to the legacy communication device for performing the reception.

4. The method of claim 1, wherein each association set index of the subset of the UL subframe of the second UL/DL configuration and each association set index of the rest of the first new association set are different.

5. The method of claim 1, further comprising:
determining a second new association set according to the association set of the UL subframe of the second UL/DL configuration; and
determining the HARQ resource of the UL subframe according to the mapping, the first new association set and the second new association set.

6. The method of claim 5, wherein the second new association set does not overlap with the subset of the UL subframe of the second UL/DL configuration.

7. The method of claim 5, wherein the second new association set partly overlaps with the first new association set.

8. The method of claim 5, wherein the second new association set does not overlap with the first new association set.

9. The method of claim 5, wherein a resource region corresponding to the first new association set does not overlap with a resource region corresponding to the second new association set.

10. The method of claim 1, wherein when the advanced UE replaces the first new association set completely by the subset of the association set of the UL subframe of the second UL/DL configuration, the advanced UE stops configuring the mapping and determines the HARQ resource of the UL subframe according to the first new association set without using the mapping.

11. The method of claim 1, wherein an interleaving for the first new association set is performed according to the first UL/DL configuration.

12. The method of claim 1, wherein the step of determining the first new association set of the UL subframe according to the association set of the UL subframe of the first UL/DL configuration comprises:
determining the first new association set as the association set of the UL subframe of the first UL/DL configuration.

13. The method of claim 1, wherein the step of configuring the mapping between the at least one sequence index of the UL subframe of the first UL/DL configuration and the first new association set according to the first UL/DL configuration comprises:
configuring the mapping as a mapping between the at least one sequence index of the UL subframe of the first UL/DL configuration and the association set of the UL subframe of the first UL/DL configuration.

14. The method of claim 1, wherein the legacy communication device and the advanced communication device are the same communication device, the first UL/DL configuration corresponds to a first component carrier, and the second UL/DL configuration corresponds to a second component carrier.

* * * * *